United States Patent Office 3,554,981
Patented Jan. 12, 1971

3,554,981
POLY(ESTER-IMIDES) FROM MALEOPIMARIC
ACID AND AMINOALCOHOLS
Martin F. Sloan, Brandywood, Del., assignor to Hercules Incorporated, Wilmington, Del., a corporation of Delaware
No Drawing. Filed Oct. 10, 1967, Ser. No. 674,123
Int. Cl. C08g 20/32
U.S. Cl. 260—78
7 Claims

ABSTRACT OF THE DISCLOSURE

Novel polymeric materials for use in the manufacture of inks are prepared from maleopimaric acid and aminoalcohols.

This invention relates to novel polymeric materials adapted particularly for use in the manufacture of ink.

The polymeric materials of this invention are derived by polymerization and have recurring units of the following general formula

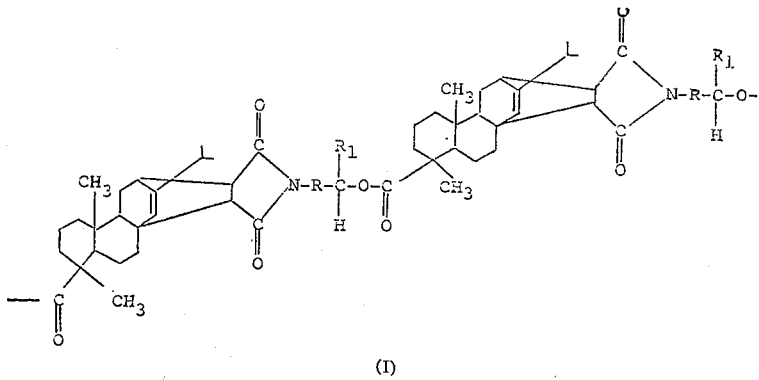

(I)

In Formula I, R is selected from the group consisting of alkylene radicals having from 1 through 35 carbon atoms and cycloalkylene radicals. The alkylene radical can be straight chain or branched chain. $R_1$ is selected from the group consisting of hydrogen and $C_1$–$C_3$ alkyl.

Poly(ester-imides) is the term sometimes used hereinafter when reference is made to polymeric materials represented by Formula I.

Poly(ester-imides) are derived by polymerization of a reaction product of maleopimaric acid, or a lower alkyl ester thereof, with an alkanolamine (aminoalcohol). Maleopimaric acid and its lower alkyl esters are known in the art and are represented by the formula

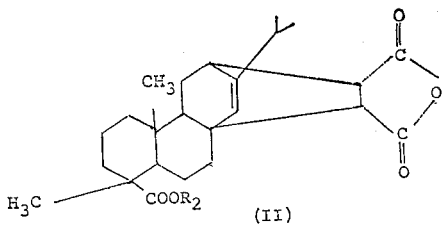

(II)

wherein $R_2$ is hydrogen or alkyl. When $R_2$ is hydrogen Formula II represents maleopimaric acid, and when $R_2$ is alkyl such as methyl, ethyl, propyl, butyl and the like, Formula II is representative of the alkyl esters of maleopimaric acid which can be employed. Methods of preparing maleopimaric acid are disclosed and described in U.S. Pats. 2,359,980 and 2,409,930. A method of obtaining maleopimaric acid in essentially pure form is disclosed and described in Pat. 2,628,226. Whenever moleopimaric acid is used herein after, it is intended to include the esters thereof.

Aminoalcohols that can be employed in reaction with maleopimaric acid to give a reaction product which can be polymerized to provide the resinous polymers or polymeric materials of this invention have the formula

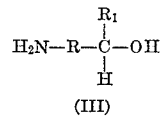

(III)

wherein R and $R_1$ are as above defined. In the above Formula III when $R_1$ is hydrogen, the alcohol group is primary, and when $R_1$ is a lower alkyl group of from 1 to 3 carbon atoms the alcohol group is secondary.

Illustrative aminoalcohols include ethanol amine, 3-amino-1-propanol, 1-amino-2-propanol, 2-amino-2-methyl-1-propanol, 7-amino-3-heptanol, 10-amino-6-ethyl-8-methyl-2-decanol, 4-(aminomethyl)cyclohexanemethanol and the like.

PREPARATION OF POLY(ESTER-IMIDES)

Poly(ester-imides) are prepared by condensation polymerization of a reaction product of maleopimaric acid and at least one aminoalcohol as hereinabove defined. The reaction product is prepared by first admixing maleopimaric acid with an aminoalcohol in a mole ratio of from about 1:1 to about 1:10. Aminoalcohols are solvents for maleopimaric acid and when used in a mole ratio of about 1:10 or above, dissolve substantially all the maleopimaric acid. If the amount of aminoalcohol employed is insufficient to dissolve all the maleopimaric acid a supplementary solvent such as methanol, ethanol, propanol, or acetone is used. The resulting solution of maleopimaric acid, aminoalcohol and supplementary solvent, if required, is heated to a temperature of from about 80° C. to about 150° C. In this temperature range, reaction takes place between the maleopimaric acid and the aminoalcohol. Water is formed as one of the reaction products and is removed in order for the reaction to go to completion. The product formed is an N-hydroxyalkyl maleopimaric acid imide referred to sometimes hereinafter as a hydroxy-imide. The hydroxy-imide is in solution with the excess aminoalcohol and/or supplementary solvent and is precipitated from solution by addition of dilute aqueous mineral acid. The hydroxy-imide precipitate is recovered and can be crystallized from a solvent such as aqueous ethanol to give a substantially pure product, if desired.

The time required to prepare the maleopimaric acid aminoalcohol reaction product can vary from several hours to two or three days depending on the temperature employed, lower temperatures requiring longer times. Reaction time is also dependent on the aminoalcohol reacted. As the molecular weight of the aminoalcohol increases, reaction time required increases.

The resinous poly(ester-imides) are prepared by polymerization of the hydroxy-imide. The hydroxy-imide is heated above its melting point to initiate polymerization. The temperature range in which polymerization takes place is from about 200° C. to about 300° C., the preferred temperature range being from about 250° C. to about 300° C. The upper limit of the temperature of the polymerization reaction is determined to some extent by the molecular weight of the hydroxy-imide being polymerized. In general, as the molecular weight of the hydroxy-imide increases, the upper limit at which the condensation polymerization reaction takes place will also increase.

Water or alcohol is formed as a product of the polymerization of the hydroxy-imide depending on whether maleopimaric acid or an ester thereof is employed as a reactant in preparation of the hydroxy-imide. This water or alcohol must be removed. Vacuum can be applied to aid in the removal of these products.

The resinous polymers prepared as described above have a light amber color, and a molecular weight of from about 868 to about 50,000.

The time required for the polymerization of the hydroxy-imide can vary from several hours to several days. Reaction time is dependent on the temperature at which the polymerization is conducted. The polymerization rate is faster at higher temperatures. Reaction time is also dependent on the desired degree of polymerization or desired molecular weight of the polymer, higher molecular weight polymers requiring longer reaction times, and the position of the hydroxyl group in the hydroxy-imide. A hydroxy-imide in which the hydroxyl group is primary will react faster than a hydroxy-imide wherein the hydroxyl group is secondary.

The resinous polymers of this invention can also be produced without preparation of a specific isolated intermediate as above described. Utilizing this procedure maleopimaric acid is charged to a reaction vessel and heated above its melting point to about 250° C. Aminoalcohol is admixed with the molten maleopimaric acid. Water formed during the reaction is continuously removed. When no further water is being removed, the temperature of the reaction mass is raised to about 275° C., and vacuum is applied for several hours. The reaction mass is then cooled and the resinous polymer recovered.

The following examples are illustrative of the resinous poly(ester-imides) of this invention having a recurring unit of the following Formula IV

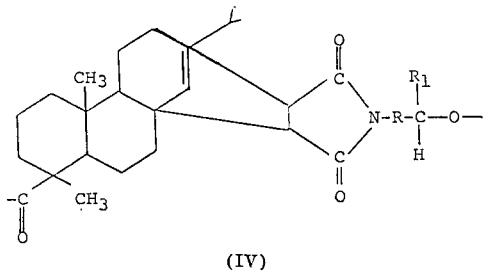

(IV)

wherein R and $R_1$ define the same groups as represented for Formula I herein. All parts are by weight unless otherwise specified.

EXAMPLE 1

A mixture of 250 parts of maleopimaric acid and 1000 parts of ethanolamine is heated and agitated in a reaction vessel at 150° C. for 21 hours to provide a reaction mass. Water is formed during reaction and is continously removed from the reaction mass. The reaction mass is cooled to room temperature (about 23° C.), and is poured into 5000 parts of water to provide a mixture which is acidified with hydrochloric acid to a pH of 1. N-(2-hydroxyethyl) maleopimaric acid imide precipitates from the mixture and is filtered, washed with water, and recrystallized twice from aqueous ethanol. About 208 parts of N-(2-hydroxyethyl) maleopimaric acid imide is recovered. This hydroxy-imide has a melting point of 228–230° C. and an acid number of 124.

The following example illustrates polymerization of the hydroxy-imide of Example 1.

EXAMPLE 2

A reaction vessel equipped with a paddle stirrer, thermometer, nitrogen inlet and distillation head is charged with 174.1 parts of N-(2-hydroxyethyl) maleopimaric acid imide, prepared in Example 1. The N-(2-hydroxyethyl) maleopimaric acid imide is heated to 275° C. over a period of 48 minutes and maintained at 270–280° C. for 6 hours. The resulting reaction mass is then subjected to a vacuum of 1.25 mm. Hg for an additional 7.25 hours at 270–280° C. to aid in removal of water which is formed during the polymerization reaction. The resulting reaction mass is cooled to provide a reaction product which is a resinous polymer having an acid number of 17, a drop softening point of 225° C., and a molecular weight of 2800–3000. The resinous polymer is soluble in aromatic hydrocarbons such as benzene.

The following example illustrates a resinous polymer preparation from the methyl ester of maleopimaric acid and ethanolamine.

EXAMPLE 3

Methyl maleopimarate is reacted with ethanolamine using substantially the same procedure as described in Example 1. The product produced is methyl N-(2-hydroxyethyl) maleopimaric ester imide.

A reaction vessel is charged with 17.75 parts of methyl N-(2-hydroxyethyl) maleopimaric ester imide which comprises the reaction mass. The reaction mass is kept blanketed with nitrogen. The reaction vessel is then placed in an oil bath at 250° C. for 30 minutes to initiate the polymerization. During this time a slow stream of nitrogen is passed through the reaction mass. The temperature of the reaction mass is then gradually raised to 275° C. over a 20 minute period. After six hours at these conditions a vacuum of 0.4 mm. Hg is applied to the reaction mass and heating is continued for 16.5 hours. Substantially all methanol which is formed during the polymerization reaction is removed at these conditions. A reaction product is recovered which is a resinous polymer with a drop softening point of 225° C. and a molecular weight of 3400–3500.

The following example illustrates preparation of a poly-(ester-imide) by polymerization of the reaction product of maleopimaric acid, and an aminoalcohol wherein the hydroxyl group is secondary.

EXAMPLE 4

About 25 parts of maleopimaric acid is dissolved in 78.9 parts of ethanol and admixed with 10 parts of 1-amino-2-propanol. The resulting mixture is heated to reflux temperature and held at this temperature for 12 hours to provide a reaction mass. The reaction mass is cooled and poured into water to provide a mixture. The mixture is acidified with hydrochloric acid. N-(2-hydroxypropyl) maleopimaric acid imide precipitates from the mixture. This hydroxy-imide cannot be induced to crystallize. The hydroxy-imide is then dissolved in ether, and washed first with 5% hydrochloric acid, and then with water. The ether is then evaporated leaving amorphous N-(2-hydroxypropyl) maleopimaric acid imide with an acid number of 120. This hydroxy-imide is polymerized by heating it in a reaction vessel at 275° C. for 24 hours. The resinous polymer recovered is light amber in color and has an acid number of 50. This polymer is soluble in aromatic hydrocarbons.

The following example illustrates preparation of a poly(ester-imide) from the reaction product of maleopimaric acid and 2-amino-2-methyl-1-propanol.

EXAMPLE 5

About 125 parts of maleopimaric acid is dissolved in 394.5 parts of ethanol and admixed with 60 parts of 2-amino-2-methyl-1-propanol. The resulting mixture is heated to reflux temperature and refluxed for 16 hours to provide a reaction mass. The solid recovered from the reaction mass utilizing the procedure of Example 4 is not completely reacted as determined by acid number. The solid is recrystallized from a methanol-water solution and admixed with 25 parts of maleopimaric acid, 402 parts of n-propanol and 50 parts of 2-amino-2-methyl-1-propanol. The resulting mixture is heated to reflux temperature, and refluxed for 16 hours. The reaction mass is then cooled and N - (2 - hydroxy - 1,1 - dimethylethyl)-maleopimaric acid imide is recovered utilizing the procedure of Example 4. This hydroxy-imide is recrystallized from methanol water solution an dhas an acid number of 121. This hydroxy-imide is polymerized by heating it in a reaction vessel at 280° C. for seven hours. The resinous polymer recovered has an acid number of 47, a drop softening point of 215° C. and a molecular weight of 1875.

The following example illustrates the preparation of a rotogravure ink utilizing the resinous polymer prepared in Example 2.

EXAMPLE 6

About 10 parts of chrome yellow pigment is dispersed directly into about 40 parts of the resinous polymer prepared in Example 2, by use of a two-roller rubber mill. The resulting pigmented resin chips are dissolved in 50 parts of toluene. The resulting solution is a highly satisfactory rotogravure ink.

EXAMPLE 7

The following example illustrates a continuous procedure for preparation of resinous poly(ester-imides).

A reaction vessel, equipped with stirrer, steam jacketed reflux condenser and dropping funnel, is charged with 147.5 parts of maleopimaric acid. The material is heated to 250° C. and, over a 45 minute period, 23.3 parts of ethanolamine, is added dropwise to provide a reaction mass. Water is formed during the reaction and is removed continuously. When the ethanolamine addition is complete, the reflux condenser is removed and it is replaced with a distillation head. The temperature of the resulting reaction mass is raised to 275° C. After three hours of heating at 275° C., a vacuum of 0.1 mm.-0.15 mm. Hg is applied to the reaction mass and heating at 275° C. is continued for 12.5 hours. The reaction mass is cooled and a resinous polymer recovered having an acid number of 17, a drop softening point of 211° C. and a molecular weight of 2500-2700.

During the preparation of the poly(ester-imides) heretofore described, the polymerizing mass should be kept under an inert atmosphere to prevent oxidation to undesired side products.

Preparing the hydroxy-imide intermediate readily permits mixture of hydroxy - imides to be polymerized to form copolymers.

It is to be understood that the above specification is illustrative of this invention and not in limitation thereof.

What I claim and desire to protect by Letters Patent is:

1. A resinous polymer consisting essentially of recurring units of the formula

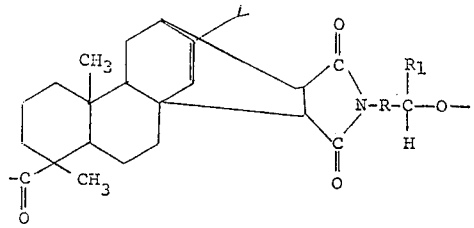

wherein R is selected from the group consisting of alkylene radicals having from 1–35 carbon atoms and cycloalkylene radicals, and $R_1$ is selected from the group consisting of hydrogen and $C_1$–$C_3$ alkyl.

2. The resinous polymers of claim 1 wherein R is $CH_2$ and $R_1$ is hydrogen.

3. The resinous polymers of claim 1 wherein R is $CH_2$ and $R_1$ is $CH_3$.

4. The process of preparing the resinous polymers of claim 1 comprising (a) preparing an admixture comprising a material (1) selected from the group consisting of maleopimaric acid, the lower alkyl esters of maleopimaric acid and mixtures thereof, and a material (2) selected from the group consisting of aminoalcohols of the formula

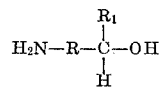

and mixtures thereof, wherein R is selected from the group consisting of alkylene radicals having 1–35 carbon atoms and cycloalkylene radicals, and $R_1$ is selected from the group consisting of hydrogen and $C_1$–$C_3$ alkyl, (b) heating the admixture to a temperature of from about 200° C. to about 300° C. for a time sufficient to provide a resinous polymer, and (c) recovering the resinous polymer.

5. The process of claim 4 wherein polymerization temperature is from about 250° C. to about 300° C.

6. The process of claim 4 wherein material (1) is maleopimaric acid and material (2) is $H_2N$—$(CH_2)_2$—OH.

7. The process of claim 4 wherein material (1) is maleopimaric acid and material (2) is

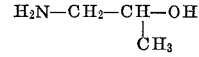

References Cited

UNITED STATES PATENTS

| | | | |
|---|---|---|---|
| 2,540,776 | 2/1951 | Cadwell | 260—101 |
| 2,982,750 | 5/1961 | Cyba et al. | 260—101 |
| 3,043,789 | 7/1962 | Cyba | 260—101 |
| 3,179,614 | 4/1965 | Edwards | 260—78 |

HAROLD D. ANDERSON, Primary Examiner

U.S. Cl. X.R.

106—20, 32; 260—33.6, 37, 326.5